United States Patent
Meguro et al.

(10) Patent No.: US 7,542,312 B2
(45) Date of Patent: Jun. 2, 2009

(54) ELECTRIC POWER CONVERTER

(75) Inventors: Hikaru Meguro, Hitachi (JP); Hiroshi Ikarashi, Hitachi (JP); Keizo Shimada, Hitachi (JP); Masashi Toyota, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/757,474

(22) Filed: Jun. 4, 2007

(65) Prior Publication Data

US 2007/0230223 A1 Oct. 4, 2007

Related U.S. Application Data

(63) Continuation of application No. 11/398,610, filed on Apr. 6, 2006, now abandoned, which is a continuation of application No. 11/092,672, filed on Mar. 30, 2005.

(51) Int. Cl.
*H02M 1/12* (2006.01)
*H02M 1/14* (2006.01)
*H02M 3/335* (2006.01)

(52) U.S. Cl. .................. 363/41; 363/98; 363/131; 363/17

(58) Field of Classification Search ............ 363/40, 363/41, 37, 98, 131, 17
See application file for complete search history.

(56) References Cited

U.S. PATENT DOCUMENTS

| | | | | |
|---|---|---|---|---|
| 4,597,037 A * | 6/1986 | Okado | ............. | 363/41 |
| 4,967,334 A * | 10/1990 | Cook et al. | ............. | 363/34 |
| 5,047,910 A * | 9/1991 | Levran et al. | ............. | 363/41 |
| 5,091,842 A * | 2/1992 | Kawai | ............. | 363/98 |
| 5,526,252 A * | 6/1996 | Erdman | ............. | 363/41 |
| 5,706,186 A * | 1/1998 | Blasko | ............. | 363/41 |
| 6,208,537 B1 * | 3/2001 | Skibinski et al. | ............. | 363/40 |
| 6,882,549 B2 * | 4/2005 | Huggett et al. | ............. | 363/40 |
| 6,924,993 B2 * | 8/2005 | Stancu et al. | ............. | 363/41 |

FOREIGN PATENT DOCUMENTS

| | | |
|---|---|---|
| JP | 64-55076 A | 3/1989 |
| JP | 03-218270 | 9/1991 |
| JP | 2004-248419 | 9/2004 |

OTHER PUBLICATIONS

Japanese Office Action dated May 2, 2006 (Two (2) pages).

* cited by examiner

*Primary Examiner*—Bao Q Vu
(74) *Attorney, Agent, or Firm*—Crowell & Moring LLP

(57) ABSTRACT

By reduction in loss and noise of a three-phase reactor on the AC side of an electric power converter, compactness and reduction in weight of the reactor are realized, and countermeasures for heat and noise are reduced, and a specific frequency component is reduced, thus cost reduction and conversion efficiency are improved, and carriers of a controller are prepared in correspondence to the phases of the electric power converter, and moreover a phase difference of each carrier is set properly.

18 Claims, 4 Drawing Sheets

ELECTRIC POWER CONVERTER

This application is a continuation of U.S. patent application Ser. No. 11/398,610, filed Apr. 6, 2006, which is a continuation of U.S. patent application Ser. No. 11/092,672, filed Mar. 30, 2005.

FIELD OF THE INVENTION

The present invention relates to an electric power converter.

BACKGROUND OF THE INVENTION

In the electric power converter, for example, as shown in FIG. 1 of Japanese Patent Laid-open No. Hei 3 (1991)-218270, to remove high-frequency components generated in an AC line and a DC line, a capacitor is connected between the AC line and the DC line. The converter compares signal waves of respective phases having a phase difference from one carrier common to the respective phases, gives positive logic and negative logic high frequency pulses, which are output of comparators, to switching devices to control the PWM.

When a function for removing the high-frequency components generated in the AC line and DC line is provided, the following advantages can be obtained.

(1) Without insulating the AC line and electric power converter by a transformer, a leakage current Ir can be reduced.

(2) A high-frequency current leaking from the electric power converter is reduced, so that an EMI countermeasure can be taken.

SUMMARY OF THE INVENTION

However, there is a circuit through which an excessive high-frequency current $I_0$ flows, so that loss and noise of a reactor installed between the AC line and the DC line are increased.

An object of the present invention is to reduce the high-frequency current $I_0$, reduce the loss and noise of the reactor, and furthermore realize compactness, cost reduction, and improvement of the conversion efficiency of the electric power converter by reduction in the loss and noise.

The present invention installs a carrier source for each phase and gives a phase difference to a carrier of each phase.

Other objects, advantages and novel features of the present invention will become apparent from the following detailed description of the invention when considered in conjunction with the accompanying drawings.

DESCRIPTION OF THE PREFERRED EMBODIMENTS

Figure 1:
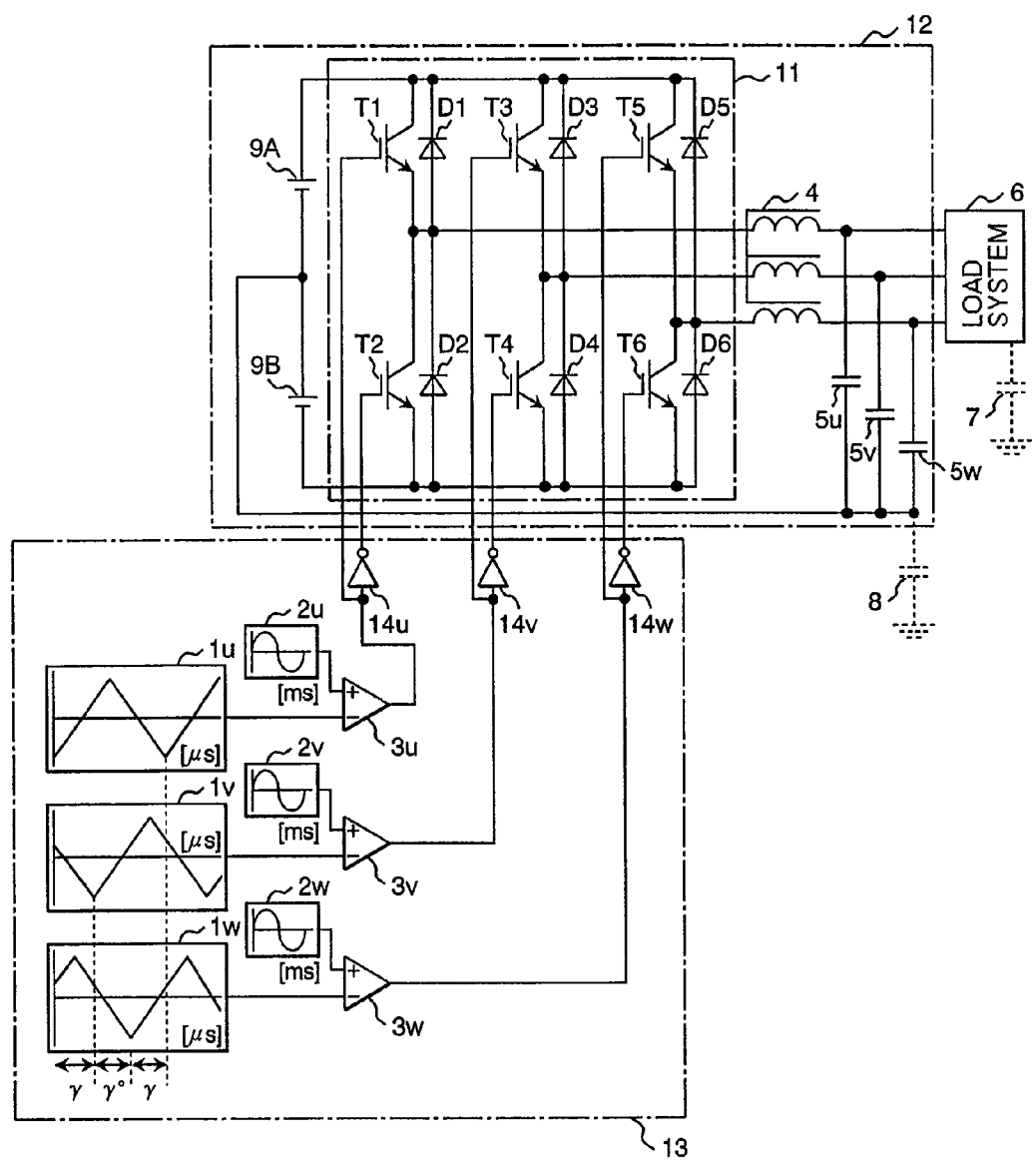
FIG. 1 is a schematic view of a three-phase three-wire inverter circuit.

FIG. 1 is a circuit diagram showing the electric power converter of an embodiment of the present invention, which is composed of a main circuit 12, a load system 6, and PMW controller 13. The main circuit 12 is structured so as to connect 6 switching devices T1, T2, T3, T4, T5, and T6 and diodes D1, D2, D3, D4, D5, and D6 connected respectively to the switching devices T1 to T6 in parallel as a three-phase bridge. To the DC side of the three-phase bridge circuit, DC power supplies 9A and 9B connected in series are connected.

The switching devices T1 to T6 of the main circuit 12 are driven by an on-off control signal for PWM (pulse width modulation) control given from the PWM controller 13 and function as a voltage source PWM converter.

The AC side of the main circuit 12 is connected to the load system 6 via the AC lines. The DC side of the main circuit 12 is connected to the AC side via the line N. Into the phases of the AC lines, reactors 4 are respectively inserted and between the AC lines of the reactors 4 on the load system side and the line N, capacitors 5u, 5v, and 5w are connected. In this embodiment, the line N is connected to the middle point of the DC power supplies 9A and 9B.

A high frequency filter is formed by these reactors 4 and the capacitors 5u, 5v, and 5w. In the PWM controller 13, according to the relative sizes of carriers 1u, 1v, and 1w and signal waves 2u, 2v, and 2w, comparators 3u, 3v, and 3w output an ON signal or an OFF signal.

The output of the comparators 3u, 3v, and 3w is supplied to the respective switching devices T1 to T6 directly or via NOT circuits 14u, 14v, and 14w. The frequency of the carriers 1u, 1v, and 1w is, for example, about 7 kHz. Between the load system 6 and the earth, a parasitic capacitor 7 is formed and between the electric power converter and the earth, a parasitic capacitor 8 is formed.

The output of the comparators 3u, 3v, and 3w is transferred to the switching devices T1 to T6 in a three-phase bridge circuit 11. Further, the carriers 1u, 1v, and 1w are given an optimal phase difference. The value of a phase difference γ of the carrier of each phase is decided by Formulas (8) and (9) as indicated below. Further, even if the phase difference of the carrier of each phase is set to the values other than those of Formulas (8) and (9), an effect can be obtained.

Figure 2:
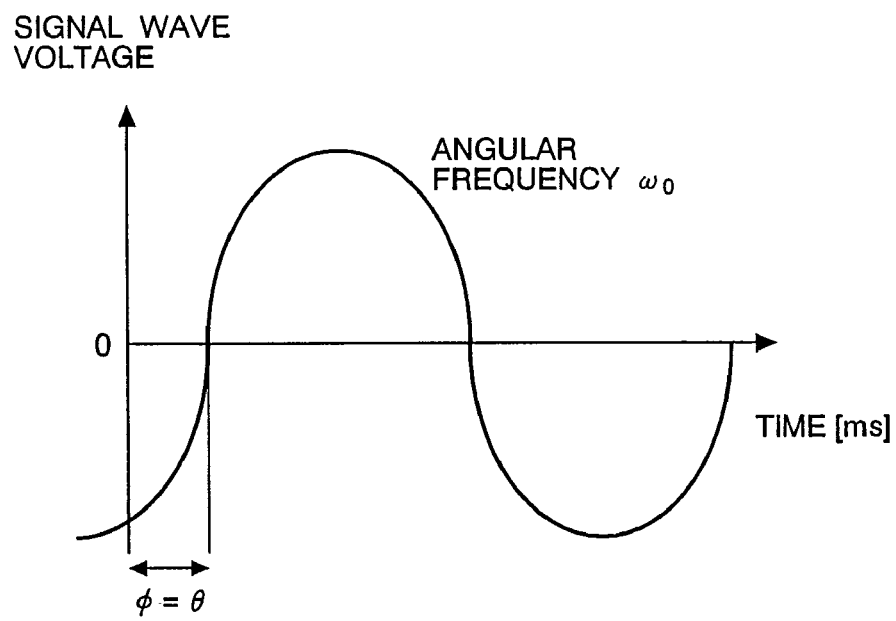
FIG. 2 is a drawing showing the phase relationship of the signal wave and carrier in the circuit shown in FIG. 1.
Figure 2:
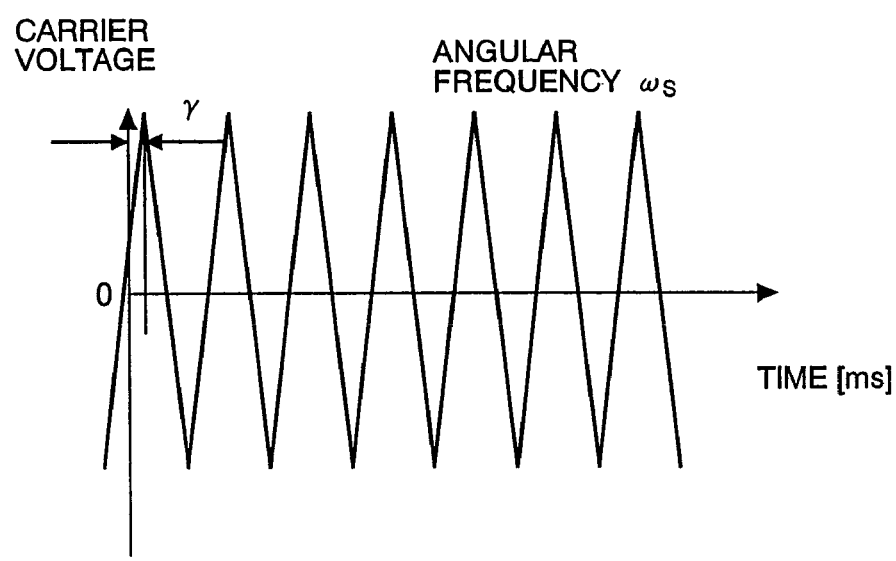

When a signal wave is set to a sine wave and a carrier is set to a triangle wave, the frequency component of each phase is given by Formulas (1) and (2) indicated below. In addition, the relation between the signal wave and carrier is shown in FIG. 2. (Reference: "Semiconductor Power Conversion Circuit, Electric Society, Semiconductor Electric Power Conversion System Investigation Committee", Electric Society, pp. 116-117; The same point of view as the reference can be used.)

When n=1, 3, 5, . . .

[Formula 1]

$$(-1)^{(n+1)/2}\left(\frac{4}{n\pi}\right)\left[J_k\left(\frac{a n \pi}{2}\right)\left\{\begin{array}{l}\cos((k\omega_0 + n\omega_s)t + k\phi) + \\ \cos((k\omega_0 - n\omega_s)t + k\phi)\end{array}\right\}\right] \quad (1)$$

It is assumed that k=2λ and λ=0, 1, 2, 3, . . .
When n=2, 4, 6, . . .

[Formula 2]

$$(-1)^{n/2}\left(\frac{4}{n\pi}\right)\left[J_k\left(\frac{a n \pi}{2}\right)\left\{\begin{array}{l}\sin((k\omega_0 + n\omega_s)t + k\phi) + \\ \sin((k\omega_0 - n\omega_s)t + k\phi)\end{array}\right\}\right] \quad (2)$$

It is assumed that k=2λ+1 and λ=0, 1, 2, 3, . . . .

n: degree of harmonics of carrier, k: degree of harmonics concerning signal wave, a: modification factor, $\omega_0$: angular frequency of signal wave, $\omega_s$: fundamental angular frequency of carrier wave, $\phi$: phase of signal wave, Jk(x): Bessel function of the first kind)

In Formulas (1) and (2), the amplitude does not depend at all on the phase difference between the signal wave and the carrier. Therefore, only the phases in the sin and cos may be considered. Furthermore, in Formulas (1) and (2), in consideration of only the phase of the carrier, Formulas (3) to (5) indicated below are substituted for Formulas (1) and (2).

[Formula 3]

$$t = t' + \delta \quad (3)$$

$$\phi = -\omega_0 \delta + \theta \quad (4)$$

$$\gamma = \omega_s \delta \quad (5)$$

$\delta$: time difference of carrier, t': time, $\theta$: phase difference of signal wave, $\gamma$: phase difference of carrier The inside of each of the items of cos and sin of Formulas (1) and (2) for which Formulas (3) to (5) indicated below are substituted is as indicated in Formula (6).

[Formula 4]

$$(k\omega_0 \pm n\omega_s)t + k\theta \pm n\gamma \quad (6)$$

In Formula (6), the part different in each phase is only the item of Formula (7).

$$k\theta n\gamma \quad (7)$$

Furthermore, in consideration of only n=1 and k=0 which are main components of the harmonics of $I_0$, only $\gamma$ remains. To negate the main components of the harmonics of $I_0$ by the phase differences of the carrier of each phase, when the phase difference $\gamma$ calculated by Formula (8) is set in each phase, $I_0$ can be made smaller.

[Formula 5]

$$\gamma = \frac{2\pi q}{p} \quad (8)$$

p: phase of electric power converter q: integer (for example, when p=3, q= . . . , −7, −5, −2, −1, +1, +2, +4, +5, +7, . . . ) meeting p≠0 in mode q Further, in $I_0$, to negate the frequency components other than n=1 and k=0, Formula (9) must be satisfied.

[Formula 6]

$$k\theta \pm n\gamma = \frac{2\pi q}{p} \quad (9)$$

The main circuit 12, according to the output of the comparators 3u, 3v, and 3w in the PWM controller 13, turns on or off the switching devices T1 to T6. The output of the DC power sources 9A and 9B, via the switching devices T1 to T6 and the diodes D1 to D6, is transferred to the three-phase AC reactor 4 as pulse-shaped power including the high-frequency component.

The capacitors 5u, 5v, and 5w connected to the three-phase AC reactor 4 return the high-frequency current flowing through the three-phase AC reactor 4 to the DC power sources 9A and 9B by the neutral line N. Furthermore, among the current flowing through the three-phase AC reactor 4, the smooth currents in which the high-frequency current is removed by the capacitors 5u, 5v, and 5w are transferred to the load system 6.

In FIG. 1, when the phase difference $\gamma$ is set to 0 and in the same way as with FIG. 2, only n=1 and k=0, which are the main components of high frequency of $I_0$, are considered, $I_0$ is decided as shown in Formula (10).

[Formula 7]

$$\frac{3Ed/2}{\omega_s L}\left(-\frac{4}{\pi}\right)J_0\left(\frac{a\pi}{2}\right)\{2\cos(\omega_s t)\} \quad (10)$$

L: inductance per phase of three-phase reactor 4, Ed/2: voltage of DC power supplies 9A and 9B Further, the components of $I_0$ concerning n=1 and k=2 are negated in each phase, so that they are 0. When $\gamma=2\pi/3$ is applied from Formula (8), Formula (10) becomes 0. However, n=1 and k=2 which are negated mutually do not meet Formula (9), so that Formula (11) is obtained and they will not negate mutually. Further, in Formula (11), $\omega_s \gg \omega_0$ is set, so that the impedance of the three-phase reactor 4 per phase is approximate to $\omega_s L$.

[Formula 8]

$$\frac{3Ed/2}{\omega_s L}\left(-\frac{4}{\pi}\right)\left[J_2\left(\frac{a\pi}{2}\right)\{\cos((2\omega_0+\omega_s)t)+\cos((2\omega_0-\omega_s)t)\}\right] \quad (11)$$

In $0 \leq a \leq 1$, the magnitude relations of the amplitude of Formulas (10) and (11) are as indicated in Formula (12), so that $I_0$ can be reduced.

[Formula 9]

$$\frac{3Ed/2}{\omega_s L}\left(-\frac{4}{\pi}\right)J_0\left(\frac{a\pi}{2}\right)\times 2 > \frac{3Ed/2}{(\omega_0+\omega_s)L}\left(-\frac{4}{\pi}\right)J_2\left(\frac{a\pi}{2}\right)\times\sqrt{2} \quad (12)$$

Figure 3:
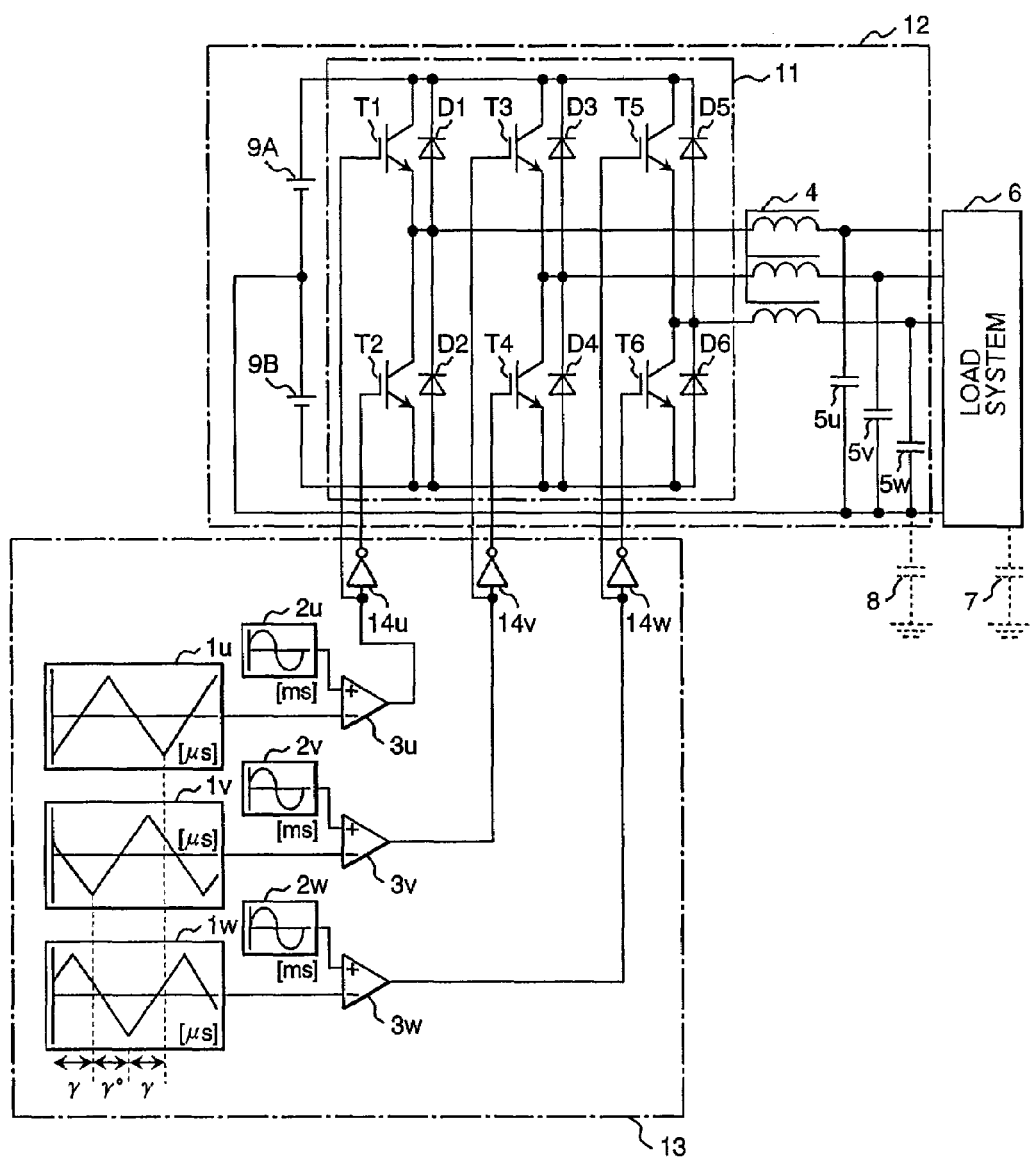
FIG. 3 is a schematic view of a three-phase four-wire inverter circuit when two DC power sources are used.
Figure 4:
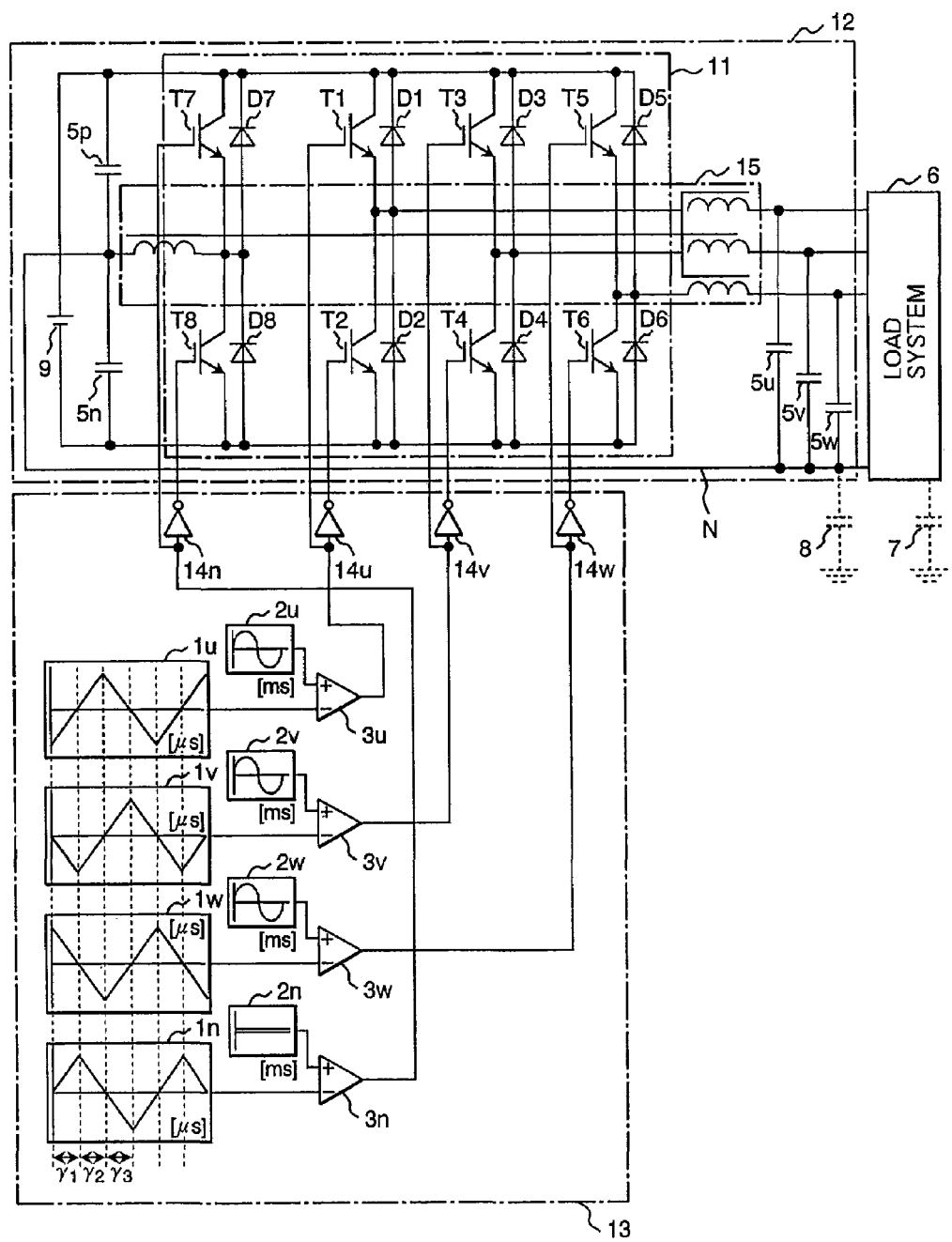
FIG. 4 is a schematic view of a three-phase four-wire inverter circuit when one DC power source is used.

The three-phase three-wire inverter circuit is described above. Next, an embodiment when the present invention is applied to the three-phase four-wire inverter circuit shown in FIG. 3 will be described. The difference between FIGS. 1 and 3 is that in FIG. 1, the neutral line N is not connected to the load system 6, while in FIG. 3, the neutral line N is connected to the load system 6. In FIG. 3, the different part from FIG. 1 will be explained mainly, though the main realization is the same as that shown in FIG. 1. In FIG. 3, the neutral phase N is formed using the two DC power supplies 9A and 9B. Depending on the conditions of the power sources, only one power source may require the three-phase four-wire inverter circuit. When only one power source requires the three-phase four-wire inverter circuit, the capacitors 5p and 5n shown in FIG. 4 form the neutral phase N. However, when a large common-mode current flows, the voltages of the capacitors 5p and 5n are unbalanced and a problem arises that the output voltage waveform is distorted. Therefore, in FIG. 4, one arm is added (switching devices T7, T8, D7, and D8 are added) and the balance of the voltages of the capacitors 5p and 5n is controlled. The differences between FIGS. 3 and 4 are as indicated in (1) to (4) described below.

(1) Addition of one arm (addition of switching devices T7, T8, D7, and D8)

(2) Addition of controller for one arm (addition of carrier 1n, etc.)

(3) Four-phase reactor 15 (three-phase reactor 4 shown in FIG. 3)

(4) Addition of capacitors 5p and 5n

When the present invention is applied to the circuit shown in FIG. 4, by selection of the phase differences γ1 to γ3 of the carrier so that the common-mode current of high frequency flowing through the four-phase reactor 15 shown in FIG. 4 is minimized, the loss and noise of the reactor can be reduced.

By change of structure only of the controller, the loss and noise of the reactor can be reduced, thus compactness and reduction in weight of the reactor can be realized and countermeasures for heat and noise can be reduced. Furthermore, a specific frequency component can be reduced, so that an EMI countermeasure can be taken. Therefore, cost reduction and improvement of the conversion efficiency can be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of converting electric power between AC power and DC power, comprising the steps:
   providing a switching device between an AC circuit and a DC line of a DC circuit;
   providing a reactor having one side connected to said switching device and another side connected at each phase of said AC circuit and said another side being further connected to DC line by as associated capacitor therebetween;
   providing a plurality of carrier waves having a phase difference among said plurality of carrier waves said phase difference reduces harmonics on said DC line;
   generating a signal as a function of characteristics of said phase difference for said switching device and
   converting DC power on said at least one DC line to AC power or converting AC power on said AC circuit to DC power to thereby provide improved conversion efficiency by reduction in energy loss and a reduction in noise from the reactor, wherein each of said plurality of carrier waves comprises a triangular waveform.

2. The method according to claim 1, wherein said at least one DC lines includes two DC lines and said capacitor is connected between said two DC lines.

3. The method according to claim 1, wherein said AC circuit has three lines each of said lines being connected by a respective capacitor to said at least one DC line.

4. The method according to claim 1, wherein said switching device functions as a Pulse Width Modulation converter.

5. The method according to claim 1, wherein said phase difference being selected so that a synthetic harmonics current of a line between the AC circuit and the DC circuit may be reduced.

6. The method according to claim 1, wherein said switching devices are arranged for each phase.

7. The method according to claim 1, wherein said capacitors are arranged for each phase.

8. The method according to claim 1, wherein a line between the AC circuit and DC circuit is formed with a common line from the capacitors arranged for each phase.

9. An apparatus for converting electric power between AC power and DC power, comprising:
   a switching device connected between an AC circuit and a DC line of a DC circuit;
   a reactor having one side connected to said switching device and another side connected at each phase of said AC circuit and said another side being further connected to said DC line by an associated capacitor therebetween;
   a carrier source outputting a plurality of carrier waves having a phase difference among said plurality of carrier waves, said phase difference reduces harmonics on said DC line;
   signal generator device outputting a signal as a function of characteristics of said phase difference to said switching device, whereby said apparatus provides conversion of DC power on said at least one DC line to AC power or conversion AC power on said AC circuit to DC power to thereby provide improved conversion efficiency by reduction in energy loss and a reduction in noise from the reactor, wherein each of said plurality of carrier waves comprises a triangular waveform.

10. The apparatus according to claim 9, wherein said at least one DC lines includes two DC lines and said capacitor is connected between said two DC lines.

11. The apparatus according to claim 9, wherein said at least one DC lines includes two DC lines and said capacitor is connected between said two DC lines.

12. The apparatus according to claim 9, wherein said switching device is a Pulse Width Modulation converter.

13. The apparatus according to claim 9, further including a plurality of signal wave generators respectively associated with each of said carrier waves.

14. The apparatus according to claim 13, further including a plurality of comparators each of said comparators receiving a respective carrier wave and signal wave at its input and outputting an on or off signal to said switching device.

15. The apparatus according to claim 9, wherein said phase difference being selected so that a synthetic harmonics current of a line between the AC circuit and the DC circuit may be reduced.

16. The apparatus according to claim 9, wherein said switching devices are arranged for each phase.

17. The apparatus according to claim 9, wherein said capacitors are arranged for each phase.

18. The apparatus according to claim 9, a line between the AC circuit and DC circuit is formed with a common line from the capacitors arranged for each phase.

* * * * *